United States Patent
Zhang et al.

(10) Patent No.: US 6,291,075 B1
(45) Date of Patent: Sep. 18, 2001

(54) OVENABLE COATED PAPERBOARD

(75) Inventors: Sukun Zhang, Mt. Pleasant, SC (US); Charles G. Ruffner, Kingsport, TN (US)

(73) Assignee: Westvaco Corporation, New York, NY (US)

( * ) Notice: Subject to any disclaimer, the term of this patent is extended or adjusted under 35 U.S.C. 154(b) by 0 days.

(21) Appl. No.: 09/513,032

(22) Filed: Feb. 25, 2000

Related U.S. Application Data

(63) Continuation-in-part of application No. 09/135,945, filed on Aug. 18, 1998, now Pat. No. 6,103,802.

(51) Int. Cl.$^7$ ................................................ B32B 9/06
(52) U.S. Cl. ............................................ 428/452; 428/513
(58) Field of Search .................................... 428/452, 513; 523/100, 101; 524/501, 522, 523, 400

(56) References Cited

U.S. PATENT DOCUMENTS

| | | | |
|---|---|---|---|
| 3,813,256 | * | 5/1974 | Feinberg . |
| 3,904,104 | * | 9/1975 | Kane . |
| 4,147,836 | * | 4/1979 | Middleton et al. . |
| 4,421,825 | * | 12/1983 | Seiter . |
| 5,002,833 | * | 3/1991 | Kinsey, Jr. et al. . |
| 5,231,268 | * | 7/1993 | Hall et al. . |
| 5,494,716 | * | 2/1996 | Seung et al. . |
| 5,500,191 | * | 3/1996 | DeMatte . |
| 5,959,024 | * | 9/1999 | Farwaha et al. . |

* cited by examiner

*Primary Examiner*—Alexander S. Thomas
(74) *Attorney, Agent, or Firm*—Daniel B. Reece, IV; Terry B. McDaniel

(57) ABSTRACT

This invention relates to ovenable and dual-ovenable coated paperboard suitable for use in producing food trays. More particularly, the invention relates to paperboard substrates which have been coated with a water-based release coating composition. Food trays made from such paperboard have superior grease resistance, high temperature resistance, and excellent food release properties—characteristics which make these trays particularly suitable for use in baking applications.

12 Claims, No Drawings

OVENABLE COATED PAPERBOARD

This application is a continuation-in-part of our commonly assigned, U.S. patent application Ser. No. 09/135,945, filed Aug. 18, 1998, now U.S. Pat. No. 6,103,802 entitled "Water-Based Release Coatings".

FIELD OF INVENTION

This invention relates to ovenable and dual-ovenable coated paperboard suitable for use in producing food trays. More particularly, the invention relates to paperboard substrates which have been coated with a water-based release coating composition. Food trays made from such paperboard have superior grease resistance, high temperature resistance, and excellent food release properties—characteristics which make these trays particularly suitable for use in baking applications.

BACKGROUND OF THE INVENTION

It has become a common practice to package convenience foods in disposable cooking or heating utensils made of coated paperboard. Due to the increased popularity of microwave cooking, substantial efforts have been made to provide dual-ovenable containers which are suitable for both conventional oven and microwave oven cooking. Accordingly, a number of polymeric plastic paperboard coatings have been developed to protect paperboard containers and their contents from the temperature extremes associated with cold storage and heating. For example, U.S. Pat. No. 3,813,256 discloses food heating utensils made of paperboard coated with polyphenylene oxide or polysulfones. The use of paperboard products coated with polypropylene or polyester are disclosed in U.S. Pat. Nos. 3,904,104 and 4,147,836. U.S. Pat. No. 4,421,825 discloses the use of titanium dioxide in coatings to give the paperboard resistance to browning.

There is a growing market demand for disposable paperboard for use in baking applications with food products such as cinnamon rolls, biscuits, and the like. However, these foods have proven to be difficult to successfully package in that they have a tendency to stick to the paperboard when baked. As sugar tends to caramelize upon heating, this adherence problem is particularly pronounced in those cases where the packaged food contains high levels of sugar.

Dual-ovenable food trays are disclosed in U.S. Pat. No. 5,494,716; while U.S. Pat. No. 5,002,833 discloses polymethylpentene (PMP) extusion-coated paperboard of the type currently utilized for ovenable baking applications. Although PMP paperboard can exhibit good grease resistance, heat resistance, and food release characteristics, the high material and processing costs associated with PMP paperboard makes this type of coated paperboard relatively expensive to use. Moreover, PMP paperboard may prove to be somewhat difficult to recycle.

Therefore, an object of this invention is to provide ovenable paperboard suitable for use in producing food trays for baking applications.

A further object of this invention is to solve the baking product adherence problem by providing ovenable coated paperboard which exhibits good grease resistance, high heat resistance and good food release characteristics.

Yet another object of this invention is to provide a dual-ovenable food tray coated with an aqueous coating composition that performs without grease seepage, browning, and emission of odors during cooking.

Additional objects, advantages, and novel features of the invention will be set forth in part in the description which follows.

SUMMARY OF THE INVENTION

These and other objects of the invention, as embodied and broadly described herein, are met by coating a paperboard substrate with an aqueous coating composition comprising at least one styrene-acrylic latex copolymer, a stearate, and, optionally, silicone.

DESCRIPTION OF THE PREFERRED EMBODIMENT

The present invention relates to ovenable and dual-ovenable coated paperboard having good grease resistance, high heat resistance and good food release characteristics. More particularly, the present invention relates to an aqueous coating composition and its use in the fabrication of ovenable and dual-ovenable food trays. The aqueous coating composition may be applied to any conventional substrate, but preferably to a paperboard substrate. The aqueous coating composition may also be applied to the surface of other coatings.

Ovenable and dual-ovenable food trays suitable for use in the present invention comprise a paperboard substrate which is coated on at least one side thereof with an aqueous coating composition comprising:

A) from about 20 to about 50 wt. % (based on the total weight of the solids in the coating composition or BOS) of a member selected from the group consisting of the styrene-acrylic latex copolymer addition polymerization reaction products of
  1) from about 60 to about 90 wt. % (based on the total weight of the polymer or BOP) of at least one nonionic free radical polymerizable monomer,
  2) up to about 5 wt. % BOP of at least one acidic free radical polymerizable monomer, and
  3) from about 40 to about 10 wt. % BOP of at least one alkali-soluble stabilizing resin having an acid number of at least 150 mg KOH/g, wherein said reaction products have a glass transition temperature in the range of from about −40° C. to about 10° C., and combinations thereof;

B) from about 80 to about 50 wt. % BOS of a member selected from the group consisting of calcium stearate, zinc stearate, and combinations thereof;

C) up to about 5 wt. % BOS of silicone; and

D) water.

Preferred aqueous coating compositions suitable for use in the present invention comprise those having:

A) from about 20 to about 50 wt. % BOS of a member selected from the group consisting of the styrene-acrylic latex copolymer addition polymerization reaction products of
  1) from about 70 to about 80 wt. % BOP of at least one nonionic free radical polymerizable monomer,
  2) up to about 5 wt. % BOP of at least one acidic free radical polymerizable monomer, and
  3) from about 30 to about 20 wt. % BOP of at least one alkali-soluble stabilizing resin having an acid number of at least 150 mg KOH/g, wherein said reaction products have a glass transition temperature in the range of from about −40° C. to about 10° C., and combinations thereof;

B) from about 80 to about 50 wt. % BOS of a member selected from the group consisting of calcium stearate, zinc stearate, and combinations thereof;

C) up to about 5 wt. % BOS of silicone; and

D) water.

If desired, the aqueous coating compositions may contain one or more adjuvants for improving the physical and/or mechanical properties of the food trays on which the compositions are applied. Suitable adjuvants include, for example, thickening agents, coalescent solvents (such as polyols), defoaming/dispersing agents, and agents for improving other properties of the coated food trays. Other additives (such as aqueous ammonia) can be added to adjust the pH of the coating compositions.

The aqueous coating composition may also be employed as the top coating or food contact layer on multi-layer coated paperboard. That is, one or more coatings may be layered between the paperboard substrate and the present aqueous coating composition to impart desired characteristics to the food tray.

The styrene-acrylic latex copolymer should have a glass transition temperature ($T_g$) of between about −40° C. and about 10° C.; with the preferred $T_g$ range being between about −20° C. and about 5° C.

Monomers which are suitable for use in the present invention include ethylenically unsaturated monomers such as olefins, monovinylaromatics, alpha, beta-ethylenically unsaturated carboxylic acids and esters thereof, ethylenically unsaturated dicarboxylic anhydrides (or acids) and esters thereof, and halo substituted olefmics. Specific examples of these monomers include, but are not limited to, the following: styrene, alpha-methylstyrene, acrylic acid, methacrylic acid, methyl methacrylate, butyl methacrylate, butyl acrylate, 2-ethylhexl acrylate, ethyl acrylate, hydroxyethyl acrylate, hydroxyethyl methacrylate, isobutyl methacrylate, itaconic acid, and combinations thereof. It is further preferred that the styrene-acrylic latex copolymer contain nonionic (meth)acrylate monomers. It is also further preferred that the alkali-soluble stabilizing resin be a styrene/maleic anhydride copolymer.

Addition polymerization reactions are well-known to those skilled in the art. The type of free-radical polymerization initiator suitable for use in the addition polymerization reaction to produce the styrene-acrylic latex copolymer is known in the art to depend upon the desired temperature for the reaction. Suitable initiators include, but are not limited to, the following: t-butyl peroxide, t-butyl peroxybenzoate, t-butyl peroctoate, cumene hydroperoxide, azobisisobutyronitrile, benzoyl peroxide, ammonium persulfate and combinations thereof.

The pH at which the styrene-acrylic latex copolymers are prepared may affect their stability. The preferred pH range for use in the addition polymerization reaction is from about 7.0 to about 11.0, with the most preferred pH range being about 8.0 to about 9.5.

It is further preferred to utilize a calcium stearate dispersion to produce the aqueous coating composition.

The coating composition may be applied to a food tray substrate, such as a paperboard substrate, in any manner known in the art. Suitable application methods include the use of blades, air knifes, rod coaters and the like. The coating composition may be applied to either or both sides of the substrate.

The following examples are provided to further illustrate the present invention and are not to be construed as limiting the invention in any manner.

EXAMPLE 1

A 1000 ml resin kettle was charged with 18.3 g of SMA 1000 (a 1:1 styrene:maleic anhydride (SMA) copolymer from Elf-Atochem), 12.0 g of SMA 2000 (a 2:1 SMA copolymer from Elf-Atochem), 12.0 g of SMA 3000 (a 3:1 SMA copolymer from Elf-Atochem), 12.0 g CA-897 (an emulsion polymerization surfactant stabilizer from Rhone-Poulenc), 6.8 g of ammonium hydroxide, and 360.0 g of deionized water and heated to 82° C. After the resin was completely dissolved (approximately 1.5 hrs.), the pH of the initial charge was measured and adjusted to 8.5. A solution of 2.25 g of ammonium persulfate in 10.0 g of water was added to the reactor, and a monomer mixture of 116.0 g of methylmethacrylate and 141.7 g of 2-ethylhexacrylate was added continuously over a 2 hour period. After the feeds were complete, the reaction was held for 30 minutes and an additional charge of 1.8 g of ammonium persulfate in 10.0 g of water was added to convert any residual monomers. Subsequently, 77.5 g of a zinc ammonium carbonate solution (consisting of 5.1 g of zinc oxide, 6.3 g of ammonium carbonate, 14.2 g of ammonium hydroxide, and 51.9 g of water) was added over a period of 30 minutes, and the result was filtered on a 325-mesh screen. The resulting final product (hereinafter referred to as Polymer No. 1) had a non-volatile content of 40.85%, a pH of 9.6, and a $T_g$ of −2.9° C.

A second polymer was produced by charging a 1000 ml resin kettle with 95.9 g of SMA 1000 (a 1:1 SMA copolymer from Elf-Atochem), 4.1 g of TL-70, a sulfonated polystyrene from National Starch, 25.4 g of ammonium hydroxide, and 376.8 g of deionized water and heated to 82° C. After the resin was completely dissolved (approximately 1.5 hrs.), the pH of the initial charge was measured and adjusted to 8.5. A solution of 2.25 g of ammonium persulfate in 10.0 g of water was added to the reactor, and a monomer mixture of 105.4 g of methylmethacrylate and 129.5 g of 2-ethylhexacrylate was added continuously over a 2 hour period. After the feeds were complete, the reaction was held for 30 minutes and an additional charge of 1.8 g of ammonium persulfate in 10.0 g of water was added to convert any residual monomers. Subsequently, 60.0 g of a zinc ammonium carbonate solution (consisting of 7.0 g of zinc oxide, 8.5 g of ammonium carbonate, 14.4 g of ammonium hydroxide, and 60.0 g of water) was added over a period of 30 minutes, and the result was filtered on a 325-mesh screen. The resulting final product (hereinafter referred to as Polymer No. 2) had a non-volatile content of 47.20%, a pH of 8.5, and a $T_g$ of −2.9° C.

A third polymer was produced by charging a 1000 ml resin kettle with 69.6 g of SMA 1000 (a 1:1 SMA copolymer from Elf-Atochem), 22.0 g of ammonium hydroxide, and 314.7 g of deionized water and heated to 84° C. After the resin was completely dissolved (approximately 1.5 hrs.), the pH of the initial charge was measured and adjusted to 8.5. Subsequently, 0.64 g of ammonium persulfate in 3.2 g of water and cumene hydroperoxide were added to the reactor, and the monomer mixture of 116.0 g of methylmethacrylate and 141.7 g of 2-ethylhexacrylate was added continuously over a 2 hour period. A co-feed consisting of 1.27 g of ammonium persulfate in 38.2 g of water was also added to maintain high conversion while reducing grit formation. After the feeds were complete, the reaction was held for 30 minutes and an additional charge of 0.5 g of ammonium persulfate in 14.2 g of water was added to convert any residual monomers. The final product was filtered and 0.16 grams were retained on a 325-mesh screen. The final product (hereinafter referred to as Polymer No. 3) had a non-volatile content of 44.8%, a pH of 8.4, a Brookfield viscosity of 75 cps (#4 at 100 rpm, 22° C.), and a $T_g$ of −2.9° C.

A series of water-based release coating compositions were produced by employing either Polymer No. 1, 2, or 3 in combination with calcium stearate and, where desired, silicone (see Table 1 below). The desired polymer was charged to a clean 2 L flask equipped with a stirrer and the calcium stearate and/or silicone was added to the polymer with stirring. The mixture was stirred for ten minutes, then allowed to settle.

A series of ovenable food trays were produced by applying the above-noted coating compositions with a Number 7 rod to the felt side of standard 18 pt. paperboard (C1S PRINTKOTE®, manufactured by Westvaco Corporation). The coatings were subsequently dried in a convection oven at 105° C. for 30 seconds, then allowed to cool. A number of sugar-containing cinnamon rolls were then placed on the coated side of the paperboard food trays and inserted into a convection oven (which had been preheated to a temperature of 375° F.) for a period of about 10 to 15 minutes. Thereafter the food trays and rolls were removed from the oven and allowed to cool for 1 minute prior to tilting the food trays to around a 60° angle to remove the rolls from the food trays. The evaluation results are given in Table 1 below.

TABLE 1

Release Properties, Heat Resistance, and Grease Resistance of One Layer Coatings

| Coating | Polymer No.[1] | Polymer Wt. %[1] | Calcium Stearate Type[2] | Calcium Stearate Wt. % | Silicone[3] % | Resistance[4] Grease | Resistance[4] Heat | Percent Released[5] |
|---|---|---|---|---|---|---|---|---|
| A. | 1 | 48.7 | 1 | 48.8 | 2.5 | 3.5 | 4.5 | 95% |
| B. | 1 | 44.0 | 1 | 55.0 | 1.0 | 3.5 | 4.5 | 95% |
| C. | 1 | 44.7 | 1 | 55.3 | 0.0 | 3.5 | 4.5 | 75% |
| D. | 2 | 30.0 | 3 | 60.0 | 0.0 | 4.0 | 3.5 | 95% |
| E. | 3 | 50.0 | 2 | 50.0 | 0.0 | 3.5 | 4.5 | 90% |
| F. | 3 | 40.0 | 2 | 60.0 | 0.0 | 4.5 | 4.5 | 80% |
| G. | 3 | 30.0 | 2 | 70.0 | 0.0 | 4.0 | 4.0 | 85% |

[1]Weight percent (Wt. %) is based upon the total weight of the coating.
[2]1: Ferro (a calcium stearate dispersion from Grant Chemical).
2: FLOWCO 53 (a calcium stearate dispersion from Henkel Corporation).
3: LUBRICAL 48 (a calcium stearate dispersion from Witco, Inc.)
[3]SILICONE 175 (a silicone additive from Dow Corning ® 175 Additive).
[4]Resistance to grease and heat was measured on a 1–5 scale, with 5 indicating excellent resistance and 1 indicating extremely poor resistance.
[5]Percent released refers to the percent of the portion of the roll in contact with the paperboard which freely released.

As noted above, the coated paperboard food trays not only exhibited superior resistance to both grease and heat, but they also showed excellent food release properties (even when employed with baking products containing a high sugar content).

EXAMPLE 2

A chemical reactor was charged with 159 parts water and 35 parts SMA 1000 (a 1:1 SMA copolymer from Elf-Atochem), and the reactor was heated up to the reaction temperature of 82° C. About 11 parts ammonium hydroxide was added to the mixture when the reactor reached 35–40° C. The heat of neutralization produced an exothermic response which raised the temperature of the reactor to about 65° C. Once the reactor reached 82° C., the reaction was held for 3–4 hours until the SMA resin was completely dissolved. After the resin had dissolved, a solution of 1 part ammonium persulfate in 38 parts water and a monomer mixture of 58 parts methylmethacrylate and 71 parts 2-ethylhexacrylate were co-fed and continuously added over a two-hour period. The reaction temperature was maintained at 83 ±1° C. After the feeds were complete, the reaction was held for 30 minutes and a solution of 1 part ammonium persulfate in 30 parts water was added. The reaction was held for one hour to complete the monomer conversion. The reaction was cooled and filtered with a 200-mesh screen. The final polymer product had a non-volatile content of about 45%, a pH of 8.4, a Brookfield viscosity of 75 cps (#4 at 100 rpm, 22° C.), and a $T_g$ of −23.6° C.

A water-based release coating composition was produced by mixing 30 parts of the polymer with 70 parts of FLOWCO 53 (a calcium stearate dispersion from Henkel Corporation) for about 20 minutes. The resulting coating composition was subsequently utilized to produce dual-ovenable paperboard by coating 16 pt. paperboard (PRINTKOTE®, manufactured by Westvaco Corporation) using a number 5 rod at press speeds from 200 to 500 ft/min. Samples from the run were employed to produce a series of food trays, which were evaluated for grease resistance, heat resistance, and release properties of baked cinnamon rolls using the method described in Example 1. The results are shown in Table 2 below.

TABLE 2

Evaluation of Grease Resistance, Heat Resistance and Release Properties

| Sample | Grease Resistance[1] | Heat Resistance[1] | Release[2] (%) | |
|---|---|---|---|---|
| 1 | 4.0 | 4.8 | 100 | 100 |
| 2 | 4.0 | 4.8 | 90 | 90 |
| 3 | 4.5 | 4.8 | 90 | 85 |
| 4 | 4.0 | 4.8 | 85 | 100 |
| Average | 4.1 | 4.8 | 91 | |

[1]Resistance to grease and heat was measured on a 1–5 scale, with 5 indicating excellent resistance and 1 indicating extremely poor resistance.
[2]Percent released refers to the percent of the portion of the roll in contact with the paperboard which freely released.

The data in Table 2 show that the coated paperboard food trays exhibited superior grease resistance, heat resistance, and release properties.

EXAMPLE 3

A polymer for use in producing the release coating compositions suitable for employment in the present invention was produced via the following method. A 1000 ml resin kettle was charged with 30.0 g of SMA 2000 (a 2:1 styrene:maleic anhydride (SMA) copolymer from Elf-Atochem), 24.0 g CA-897 (an emulsion polymerization surfactant stabilizer from Rhone-Poulence), 13.2 g of ammonium hydroxide, and 300.0 g of deionized water and heated to 82° C. After the resin was completely dissolved (approximately 1.5 hrs.), the pH of the initial charge was measured and adjusted to 8.5. A solution of 2.25 g of ammonium persulfate in 10.0 g of water was added to the reactor, and a monomer mixture of 123.0 g of methylnethacrylate and 123.0 g of 2-ethylhexacrylate was added continuously over a 2 hour period. After the feeds were complete, the reaction was held for 30 minutes and an additional charge of 1.8 g of ammonium persulfate in 10.0 g of water was added to convert any residual monomers. Subsequently, 56.0 g of a zinc ammonium carbonate solution (consisting of 25.0 g of zinc oxide, 30.0 g of ammonium carbonate, 50.0 g of ammonium hydroxide, and 80.0 g of water) was added over a period of 30 minutes, and the result was filtered on a 325-mesh screen. The resulting final product (hereinafter referred to as Polymer No. 4) had a non-volatile content of 40.85%, a pH of 9.6, and a $T_g$ of 4.3° C.

A second polymer suitable for employment in the present invention was produced via the following method. A 1000 ml resin kettle was charged with 80.2 g of SMA 1000 (a 1:1 SMA copolymer from Elf-Atochem), 3.4 g of TL-70, a sulfonated polystyrene from National Starch, 20.5 g of ammonium hydroxide, and 371.5 g of deionized water and heated to 82° C. After the resin was completely dissolved (approximately 1.5 hrs.), the pH of the initial charge was measured and adjusted to 8.5. A solution of 2.25 g of ammonium persulfate in 10.0 g of water was added to the reactor, and a monomer mixture of 105.3 g of methylmethacrylate and 130.3 g of 2-ethylhexacrylate was added continuously over a 2 hour period. After the feeds were complete, the reaction was held for 30 minutes and an additional charge of 1.8 g of ammonium persulfate in 10.0 g of water was added to convert any residual monomers. Subsequently, 60.0 g of a zinc ammonium carbonate solution (consisting of 7.4 g of zinc oxide, 8.5 g of ammonium carbonate, 7.0 g of ammonium hydroxide, and 60.6 g of water) was added over a period of 30 minutes, and the resulting final product (hereinafter referred to as Polymer No. 5) was filtered on a 325-mesh screen and a $T_g$ of $-2.9°$ C.

A water-based release coating composition was produced using Polymer No. 4, calcium stearate, and silicone Dow Corning® 175 Additive (see Table 2 below). The polymer was charged to a clean 2 L flask equipped with a stirrer and the calcium stearate and silicone was added to the polymer with stirring. The mixture was stirred for ten minutes, then allowed to settle.

A first polymer was drawn down with a Number 7 rod on the felt side of standard 18 pt. paperboard (C1S PRINTKOTE®, manufactured by Westvaco Corporation). The coated paperboard was dried in a convection oven at 105° C. for 30 seconds and allowed to cool. Thereafter a release coating composition was applied with a Number 7 rod on top of the first polymer as the food contact layer. For comparison purposes, a control food tray was produced using a hundred percent silicone solution drawn down on top of the polymer as the food contact layer (Example 3 below). The coated paperboard was subsequently dried in a convection oven at 105° C. for 30 seconds and allowed to cool.

A number of sugar-containing cinnamon rolls were placed on the coated side of the paperboard and inserted into a convection oven (which had been preheated to a temperature of 375° F.) for a period of from 10 to 15 minutes. The paperboard and rolls were then removed from the oven and allowed to cool for 1 minute prior to removal of the rolls from the board. The results of the evaluations are given in Table 3 below.

TABLE 3

Release Properties, Heat, and Grease Resistance of Two Layer Coatings

| | First Layer (Bottom) Polymer | Second Layer (Top) Coating Composition | | | | | | | |
|---|---|---|---|---|---|---|---|---|---|
| | | Polymer | | Calcium Stearate | | Silicone[3] | Resistance[4] | | Percent |
| Example | No. | No. | Wt. %[1] | No.[2] | Wt. % | Wt. % | Grease | Heat | Released[5] |
| 1. | 1 | 4 | 48.5 | 1 | 48.5 | 3.0 | 5 | 4 | 95 |
| 2. | 4 | 4 | 48.5 | 2 | 48.5 | 3.0 | 5 | 4.5 | 98 |
| 3.[6] | 5 | N/A | 0.0 | N/A | 0.0 | 100.0 | 5 | 3 | 50 |

[1]Weight percent (Wt. %) is based upon the total weight of the coating.
[2]1: FERRO (a calcium stearate dispersion from Grant Chemical).
2: FLOWCO 53 (a calcium stearate dispersion from Henkel Corporation).
[3]Silicone Dow Corning ® 175 Additive (a silicone additive from Dow Corning).
[4]Resistance to grease and heat was measured on a 1–5 scale, with 5 indicating excellent resistance and 1 indicating extremely poor resistance.
[5]Percent released refers to the percent of the portion of the roll in contact with the paperboard which was freely released.
[6]Example used as a control.

As shown above, the two-layer coated paperboards exhibited superior grease resistance, heat resistance, and release properties. These favorable characteristics are particularly evident when compared the control paperboard (which had a top layer of silicone).

EXAMPLE 4

A polymer suitable for use in producing the present invention was produced via the following method. A 1000 ml resin kettle was charged with 30.0 g of SMA 2000 (a 2:1 styrene:maleic anhydride (SMA) copolymer from Elf-Atochem), 24.0 g CA-897 (an emulsion polymerization surfactant stabilizer from Rhone-Poulenc), 13.2 g of ammonium hydroxide, and 300.0 g of deionized water and heated to 82° C. After the resin was completely dissolved (approximately 1.5 hrs.), the pH of the initial charge was measured and adjusted to 8.5. A solution of 2.25 g of ammonium persulfate in 10.0 g of water was added to the reactor, and a monomer mixture of 123.0 g of methylmethacrylate and 123.0 g of 2-ethylhexacrylate was added continuously over a 2 hour period. After the feeds were complete, the reaction was held for 30 minutes and an additional charge of 1.8 g of ammonium persulfate in 10.0 g of water was added to convert any residual monomers. Subsequently, 56.0 g of a zinc ammonium carbonate solution (consisting of 25.0 g of zinc oxide, 30.0 g of ammonium carbonate, 50.0 g of ammonium hydroxide, and 80.0 g of water) was added over a period of 30 minutes, and the result was filtered on a 325-mesh screen. The resulting polymer product had a non-volatile content of 40.85%, a pH of 9.6, and a $T_g$ of 4.3° C.

A water-based release coating composition was produced by charging 6.0 g of the polymer to a clean 2 L flask equipped with a stirrer. Subsequently, 14.0 g of LIQUAZINC AQ-90 (a zinc stearate solution from Witco Corporation) was added to the polymer with stirring. The mixture was stirred for ten minutes, then allowed to settle. The resulting coating composition was applied with a Number 7 rod to the felt side of standard 18 pt. paperboard (C1S PRINTKOTE®, manufactured by Westvaco Corporation). The coated food tray was dried in a convection oven at 105° C. for 30 seconds, then allowed to cool. A number of sugar-containing cinnamon rolls were then placed on the coated side of the paperboard food tray and inserted into a convection oven (which had been preheated to a temperature of 375° F.) for a period of about 10 to 15 minutes. Thereafter the food tray and rolls were removed from the oven and allowed to cool for 1 minute prior to tilting the paperboard to remove the rolls. Using the evaluation method described in Example 1, the coated paperboard had a grease resistance of 5, a heat resistance of 3, and a release percentage of 80.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. An ovenable food tray comprising a paperboard substrate which is coated on at least one side thereof with an aqueous coating composition comprising:
   A) from about 20 to about 50 wt. % BOS of a member selected from the group consisting of the styrene-acrylic latex copolymer addition polymerization reaction products of
      1) from about 60 to about 90 wt. % BOP of at least one nonionic free radical polymerizable monomer,
      2) up to about 5 wt. % BOP of at least one acidic free radical polymerizable monomer, and
      3) from about 46 to about 10 wt. % BOP of at least one alkali-soluble stabilizing resin having an acid number of at least 150 mg KOH/g, wherein said reaction products have a glass transition temperature in the range of from about −40° C. to about 10° C., and combinations thereof;
   B) from about 80 to about 50 wt. % BOS of a member selected from the group consisting of calcium stearate, zinc stearate, and combinations thereof;
   C) up to about 5 wt. % BOS of silicone; and
   D) water.

2. The ovenable food tray of claim 1, wherein the aqueous coating composition further comprises:
   A) from about 20 to about 50 wt. % BOS of a member selected from the group consisting of the styrene-acrylic latex copolymer addition polymerization reaction products of
      1) from about 70 to about 80 wt. % BOP of at least one nonionic free radical polymerizable monomer,
      2) up to about 5 wt. % BOP of at least one acidic free radical polymerizable monomer, and
      3) from about 30 to about 20 wt. % BOP of at least one alkali-soluble stabilizing resin having an acid number of at least 150 mg KOH/g, wherein said reaction products have a glass transition temperature in the range of from about −40° C. to about 10° C., and combinations thereof;
   B) from about 80 to about 50 wt. % BOS of a member selected from the group consisting of calcium stearate, zinc stearate, and combinations thereof;
   C) up to about 5 wt. % BOS of silicone; and
   D) water.

3. The ovenable food tray of claim 1 wherein the styrene-acrylic latex copolymer has a glass transition temperature of between about −20° C. and about 5° C.

4. The ovenable food tray of claim 1 wherein the monomer is an ethylenically unsaturated monomer selected from the group consisting of olefins, monovinylaromatics, alpha, beta-ethylenically unsaturated carboxylic acids and esters thereof, ethylenically unsaturated dicarboxylic anhydrides and esters thereof, ethylenically unsaturated dicarboxylic acids and ester thereof, halo substituted olefinics, and combinations thereof.

5. The ethylenically unsaturated monomer of claim 4 wherein the monomer is a member selected from the group consisting of styrene, alpha-methylstyrene, acrylic acid, methacrylic acid, methyl methacrylate, butyl methacrylate, butyl acrylate, 2-ethylhexyl acrylate, ethyl acrylate, hydroxyethyl acrylate, hydroxyethyl methacrylate, isobutyl methacrylate, itaconic acid, and combinations thereof.

6. The ovenable food tray of claim 1 wherein the paperboard substrate is coated on at least one side thereof with at least two coating layers of which the top coating layer is the aqueous coating composition of claim 1.

7. A duel-ovenable food tray comprising a paperboard substrate which is coated on at least one side thereof with an aqueous coating composition comprising:
   A) from about 20 to about 50 wt. % BOS of a member selected from the group consisting of the styrene-acrylic latex copolymer addition polymerization reaction products of
      1) from about 60 to about 90 wt. % BOP of at least one nonionic free radical polymerizable monomer,
      2) up to about 5 wt. % BOP of at least one acidic free radical polymerizable monomer, and
      3) from about 40 to about 10 wt. % BOP of at least one alkali-soluble stabilizing resin having an acid number of at least 150 mg KOH/g, wherein said reaction products have a glass transition temperature in the range of from about −40° C. to about 10° C., and combinations thereof;
   B) from about 80 to about 50 wt. % BOS of a member selected from the group consisting of calcium stearate, zinc stearate, and combinations thereof;
   C) up to about 5 wt. % BOS of silicone; and
   D) water.

8. The dual-ovenable food tray of claim 7, wherein the aqueous coating composition further comprises:
   A) from about 20 to about 50 wt. % BOS of a member selected from the group consisting of the styrene-acrylic latex copolymer addition polymerization reaction products of
      1) from about 70 to about 80 wt. % BOP of at least one nonionic free radical polymerizable monomer,
      2) up to about 5 wt. % BOP of at least one acidic free radical polymerizable monomer, and
      3) from about 30 to about 20 wt. % BOP of at least one alkali-soluble stabilizing resin having an acid number of at least 150 mg KOH/g, wherein said reaction products have a glass transition temperature in the range of from about −40° C. to about 10° C., and combinations thereof,
   B) from about 80 to about 50 wt. % BOS of a member selected from the group consisting of calcium stearate, zinc stearate, and combinations thereof;
   C) up to about 5 wt. % BOS of silicone; and
   D) water.

9. The dual-ovenable food tray of claim 7 wherein the styrene-acrylic latex copolymer has a glass transition temperature of between about −20° C. and about 5° C.

10. The dual-ovenable food tray of claim 7 wherein the monomer is an ethylenically unsaturated monomer selected from the group consisting of olefins, monovinylaromatics, alpha, beta-ethylenically unsaturated carboxylic acids and esters thereof, ethylenically unsaturated dicarboxylic anhydrides and esters thereof, ethylenically unsaturated dicarboxylic acids and ester thereof, halo substituted olefinics, and combinations thereof.

11. The ethylenically unsaturated monomer of claim 10 wherein the monomer is a member selected from the group consisting of styrene, alpha-methylstyrene, acrylic acid, methacrylic acid, methyl methacrylate, butyl methacrylate, butyl acrylate, 2-ethylhexyl acrylate, ethyl acrylate, hydroxyethyl acrylate, hydroxyethyl methacrylate, isobutyl methacrylate, itaconic acid, and combinations thereof.

12. The dual-ovenable food tray of claim 7 wherein the paperboard substrate is coated on at least one side thereof with at least two coating layers of which the top coating layer is the aqueous coating composition of claim 1.

* * * * *

UNITED STATES PATENT AND TRADEMARK OFFICE
CERTIFICATE OF CORRECTION

PATENT NO.    : 6,291,075 B1  
DATED         : September 18, 2001  
INVENTOR(S)   : Sukun Zhang and Charles G. Ruffner It is certified that error appears in the above-identified patent and that said Letters Patent is hereby corrected as shown below:

Column 1,  
Line 46, "extusion" and substitute therefor -- extrusion --.

Column 3,  
Line 25, delete "olefmics" and substitute therefor -- olefinics --.  
Line 29, delete "2-ethylhexl" and substitute therefor -- 2-ethylhexyl --.

Column 5,  
Line 29, Table 1, 6$^{th}$ column, insert -- Wt. -- between "Silicone$^3$" and "%".

Column 6,  
Line 46, delete "Poulence" and substitute therefor -- Poulenc --.  
Line 52, delete "methylneth-" and substitute therefor -- methylmeth- --.

Column 9, claim 1,  
Line 32, delete "46" and substitute therefor -- 40 --.

Column 10,  
Line 3, delete "olefms" and subtitute therefor -- olefins --.

Signed and Sealed this

Twelfth Day of March, 2002

*Attest:*

*Attesting Officer*

JAMES E. ROGAN  
*Director of the United States Patent and Trademark Office*